April 7, 1953
J. P. WEHBY
2,633,714
REFRIGERATED COMPARTMENTALIZED VEHICLE
Filed Aug. 8, 1949
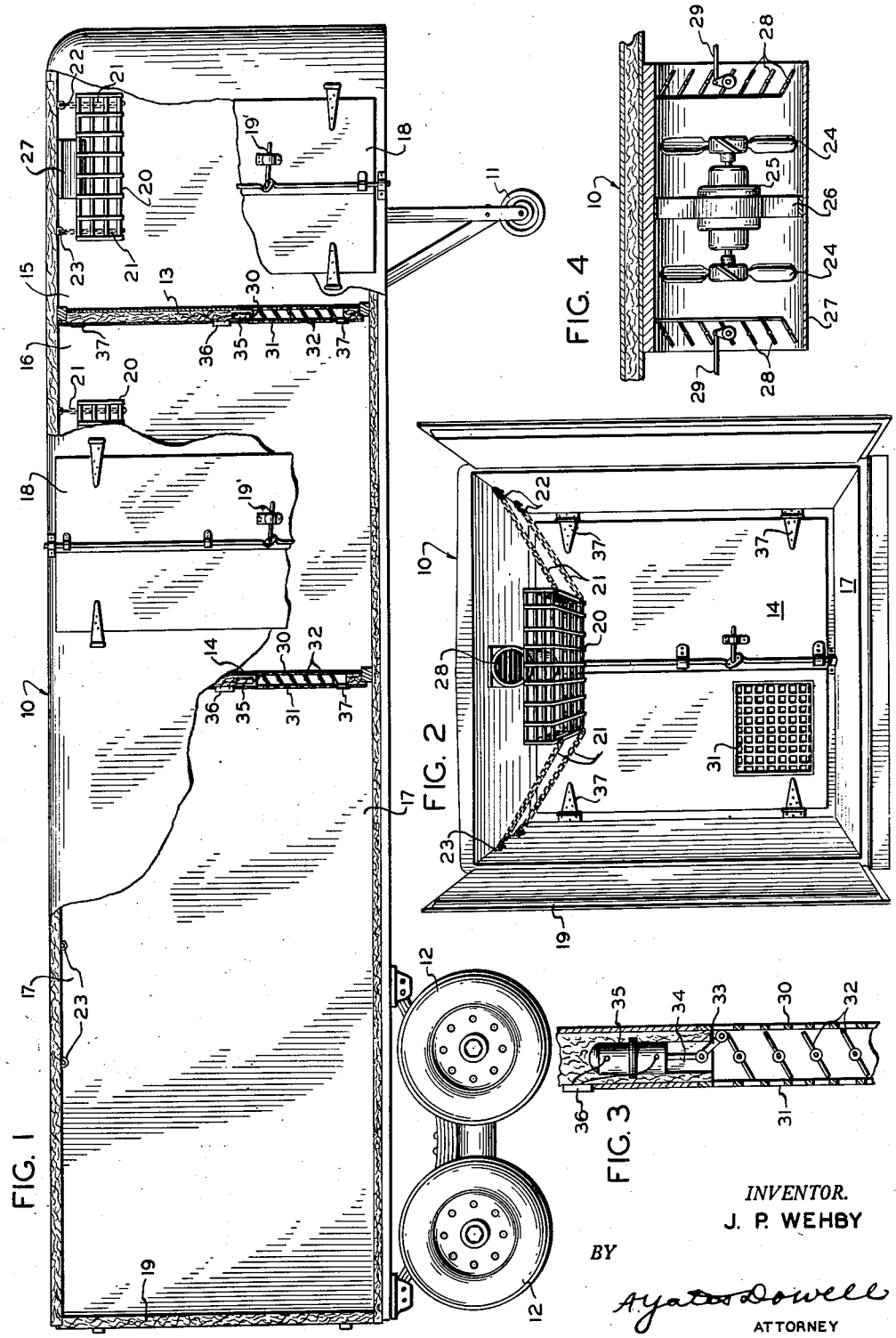
INVENTOR.
J. P. WEHBY
BY
A. Yates Dowell
ATTORNEY Patented Apr. 7, 1953

2,633,714

UNITED STATES PATENT OFFICE 2,633,714

REFRIGERATED COMPARTMENTALIZED VEHICLE

Jack P. Wehby, Nashville, Tenn.

Application August 8, 1949, Serial No. 109,149

9 Claims. (Cl. 62—6)

This invention relates to the moving of commodities and more particularly to the method of transporting the same and the equipment by which transportation is accomplished.

In the transportation of commodities of various types a variety of equipment has been employed, and various processes have likewise been employed in the operation of such equipment. Certain commodities of a more or less perishable nature have required careful, closely watched treatment, while others have required less care in handling. For example, certain commodities have been of a character that they could not be easily injured by physical contact or by extremes of temperature and humidity conditions, while others have been more susceptible of injury by physical contact and extremes in temperature and humidity conditions.

It is therefore an object of the invention to provide transportation equipment and method of use by means of which transportation of all types of articles can be more easily, inexpensively, economically, satisfactorily, and efficiently accomplished.

Another object of the invention is to provide compartmentalized transportation facilities for controlling conditions of temperature and humidity in one area without controlling them in another so that simultaneously products requiring refrigeration and humidity control can be transported with other commodities not requiring such control and in which the controlled area need only be sufficient for the commodities requiring the same.

Another object of the invention is to provide a trailer having a plurality of compartments which may be selectively controlled and by means of which access may be had to each compartment independently of the other.

Further objects and advantages of the invention will be apparent from the following specification taken in conjunction with the accompanying drawings, wherein:

Fig. 1 is a side elevation partly in section disclosing for purposes of illustration a trailer truck body having three compartments;

Fig. 2, a rear end elevation with the doors open;

Fig. 3, an enlargement of a sectional detail shown in Fig. 1; and,

Fig. 4, a longitudinal section through an air circulating casing.

Briefly stated, the invention contemplates the provision of compartments of three different sizes with the first two provided with side doors for curb loading and unloading and with the rear provided with rear doors for loading and unloading. Each compartment is adapted to be refrigerated or not, as desired. For this purpose a basket or receptacle for refrigerated medium, such as Dry Ice, may be supported in any desired manner as from the roof. Likewise, the partitions between the two end and the intermediate compartments may be in the form of doors so that they can be opened to provide fewer compartments or a single compartment.

With continued reference to the drawing a vehicle 10 may be in the form of a trailer with front and rear supporting means including wheels 11 and 12. The vehicle 10 may have spaced insulated partitions 13 and 14 forming compartments 15, 16, and 17 of the desired dimensions, within the body of the vehicle. For practical purposes the compartments 15, 16, and 17 may be, respectively, 6½, 8½, and 15 feet in length, although other lengths may be used if preferred. The trailer may be pulled by a suitable truck, not shown, in the usual manner.

Access to the compartments may be had through doors conveniently located. For the two forward compartments identical doors 18 are provided on the right side of the vehicle and are adapted to be secured in closed position by means of locking mechanism including latches 19. The rear compartment 17 may likewise have side doors for loading and unloading, however rear doors 19 have been found practical because when they are open they leave the rear compartment of the trailer fully unobstructed thus facilitating loading and unloading thereof.

The provisions of a compartmentalized vehicle of the character described permits the transportation of commodities of different characteristics and requiring different conditions of temperature and humidity. If desired, products in which definite temperature and humidity conditions are required for proper transportation may be carried in one compartment while in another compartment products of different characteristics may be carried, the condition of which in the first compartment would be improper. Also, in the third compartment additional commodities can be carried, the characteristics of which are different from those of the first two compartments. For example, in the first compartment frozen products at a relatively low or subfreezing temperature can be carried while in the second or intermediate compartment products such as fruits and eggs which cannot withstand subfreezing temperature can be carried and the temperature in the intermediate compartment may be maintained above freezing. At the same time commodities which are not readily affected by normal temperature and humidity conditions of the weather can be carried without difficulty, as for example, canned goods, flour, potatoes and numerous commodities other than foods.

If desired, all compartments including the front, intermediate, and rear may be operated under controlled conditions particularly of temperature and humidity and for this purpose wire baskets 20 may be supported by chains 21 provided with hooks 22 engaging screw eyes 23. These baskets can be filled or partially filled with a refrigerating medium such as water or carbon dioxide ice, or if preferred, a mechanical refrigerating system may be employed.

Although the same is not necessary, if desired, air circulating means may be employed in the form of one or more fans 24 driven by a motor 25 supported by a bracket 26 in the casing 27. The ends of the casing may be provided with pivotally mounted louvers 28 movable by a control rod 29 between fully closed and fully open position.

It will be readily understood from the foregoing that the present invention provides a vehicle of widely flexible use in which the number of compartments and the temperature and humidity modifications in each can be varied in accordance with the commodities transported as well as in accordance with climatic conditions en route. Refrigerating and moisture modifying medium may be carried in each compartment or in as many of the compartments as is advisable or desirable. Humidity conditions within the respective compartments may be modified in any desired manner as for example by atomization of water by conventional means, the utilization of a drying agent such as silica gel or in any other desired manner.

Means may be provided for the interchange of air between the compartments for providing enlarged usefulness. In order to permit exchange of air between the various compartments the partitions 13 and 14 may have front and rear perforated grills 30 and 31 with a plurality of connected pivotally mounted louvers 32 rockable by links 33 pivoted to extensions 34 of solenoids 35 under the control of thermostats 36. The grills 30 and 31 have their outer faces flush with the surface of the partitions 13 and 14 so that a substantially smooth surface is provided for obvious reasons.

When the vehicle is in use and it is desired to maintain only a slight degree of refrigeration within the compartments thereof the compartments may be refrigerated selectively in the manner previously described. If it is desired, for example, to keep the forward compartment 15 at a sub-freezing temperature, the intermediate compartment 16 at a temperature of approximately 40° F., and the rear compartment 17 at substantially normal atmospheric temperature the front two chambers may be refrigerated and with a control in the intermediate compartment for each of the louvers 32 and set at substantially 40° F. If the temperature of the air within the intermediate compartment 16 increases sufficiently to cause one of the thermostats 36 to operate, air will be admitted or allowed to spill from the forward compartment 15 through the louvers 32 for additionally refrigerating the intermediate compartment. On the other hand, if the temperature within the intermediate compartment drops below the desired limit the second thermostat 36 will operate to admit air from the rear compartment 17 through the partition 14 into the intermediate compartment for elevating the temperature therein. Humidity conditions may be similarly controlled and the transportation of perishable commodities transported with substantially equal facility as non-perishable commodities. Thus a compartmentalized vehicle with temperature and humidity influencing media is provided which is of substantial value in the handling of commodities of various kinds.

Partitions 13 and 14 are preferably mounted on hinges 37 to permit them to be moved from a partitioning position to a nonpartitioning position.

It will be obvious to those skilled in the art that various changes may be made in the invention without departing from the spirit and scope thereof and therefore this invention is not limited by that shown in the drawings or described in the specification but only as indicated in the appended claims.

What is claimed is:

1. A compartmentalized transportation vehicle comprising a vehicle body, partitions dividing said body into front, rear, and intermediate compartments, means supporting said partitions permitting movement of the same from partitioning to non-partitioning position, refrigeration means for said compartments arranged for independent refrigeration thereof or by removal of the partitions the entire interior of the body can be refrigerated by the refrigeration means for any compartment, said vehicle having side doors affording access to the front and intermediate compartments and rear doors affording access to the rear compartment, means for providing temperature and humidity modification in each of said compartments, including means for permitting interchange of air between said compartments to modify conditions therein, and means responsive to the means sought to be modified for controlling said interchange.

2. A compartmentalized transportation vehicle comprising a vehicle body, partitions dividing said body into front, rear, and intermediate compartments, means supporting said partitions permitting movement of the same from partitioning to non-partitioning position, refrigeration means for said compartments, said vehicle having side doors affording access to the front and intermediate compartments and rear doors affording access to the rear compartment, means for providing temperature and humidity modification in each of said compartments including means for permitting interchange of atmosphere between said compartments to modify conditions therein, and means responsive to the means sought to be modified for controlling said interchange.

3. A vehicle body, partition means in said body dividing the body into front, intermediate and rear compartments, said partition means being movable from partition forming to non-partition forming position, racks for a refrigerating medium in said compartments whereby a particular compartment can be refrigerated independently or by the removal of the partitions the entire interior of the body can be refrigerated as a unit, and means permitting restricted circulation between certain of said compartments.

4. A vehicle body, partition means in said body dividing the body into front, intermediate and rear compartments, said partition means being movable from partition forming to non-partition forming position, racks for a refrigerating medium in said compartments whereby a particular compartment can be refrigerated independently or by the removal of the partitions the entire interior of the body can be refrigerated as a unit, and means permitting restricted circulation between certain of said compartments, said vehicle having side doors affording access to the front and intermediate compartments and rear doors affording access to the rear compartment.

5. In a transportation vehicle, a vehicle body, partitions dividing said body into front, rear and intermediate compartments, means supporting said partitions permitting their removal, means whereby said compartments may be individually refrigerated, and means permitting interchange between the intermediate compartment and a front and rear compartment for modifying temperature and humidity conditions in said intermediate compartment.

6. A vehicle body, partition means in said body dividing the body into front, intermediate and rear compartments, said partition means being movable from partition forming to non-partition forming position, racks for a refrigerating medium in said compartments whereby a particular compartment can be refrigerated independently or by the removal of the partitions the entire interior of the body can be refrigerated as a unit, and means permitting restricted circulation between certain of said compartments, said vehicle having side doors affording access to the front and intermediate compartments and rear doors affording access to the rear compartment, and means subject to the conditions in the intermediate compartment for controlling said restricted circulation to maintain temperature in said intermediate compartment nearer the desired humidity.

7. In a transportation vehicle, a vehicle body, partitions dividing said body into front, rear and intermediate compartments, means supporting said partitions permitting their removal, means whereby said compartments may be individually refrigerated, and means permitting interchange between the intermediate compartment and a front and rear compartment for modifying temperature and humidity conditions in said intermediate compartment, and means subject to the conditions in the intermediate compartment for controlling said interchange to maintain temperature in said intermediate compartment nearer the desired humidity.

8. The method of transporting commodities comprising providing a series of compartments, loading commodities in said compartments some of which require modification of temperature and humidity conditions while others do not, grouping the commodities in the respective compartments in accordance with treatment desired to be accorded, and selectively modifying conditions within the compartments in accordance with the respective requirements, and selectively providing communication between certain of said compartments, and automatically controlling said communication providing means for maintaining temperature and humidity conditions in one chamber substantially nearer the desired value by the admission of air of a different character into the compartment to modify the air therein.

9. A vehicle body, adjustable partition means for selectively dividing said body transversely into at least three compartments, said partition means being movable from partitioning to non-partitioning positions, refrigeration means arranged for independent refrigeration of said compartments or for refrigeration of the entire interior of said body, means providing access to each compartment, means for selectively providing temperature and humidity modification in each of said compartments, and means for selectively permitting interchange of atmosphere between said compartments to modify conditions therein.

JACK P. WEHBY.

REFERENCES CITED

The following references are of record in the file of this patent:

UNITED STATES PATENTS

| Number | Name | Date |
| --- | --- | --- |
| 281,421 | Wight | July 17, 1883 |
| 308,151 | Frey | Nov. 18, 1884 |
| 412,270 | Kimbal | Oct. 8, 1889 |
| 1,341,744 | Hatch | June 1, 1920 |
| 1,844,822 | Rowledge | Feb. 9, 1932 |
| 1,952,981 | Frazier | Mar. 27, 1934 |
| 2,012,527 | Batchelder | Aug. 27, 1935 |
| 2,093,896 | Kiesel | Sept. 21, 1937 |
| 2,101,736 | George | Dec. 7, 1937 |
| 2,146,850 | Rear | Feb. 14, 1939 |
| 2,353,909 | Lager | July 18, 1944 |
| 2,479,128 | Maniscalco | Aug. 16, 1949 |

FOREIGN PATENTS

| Number | Country | Date |
| --- | --- | --- |
| 279,754 | Great Britain | Nov. 3, 1927 |